(12) United States Patent
Sund et al.

(10) Patent No.: US 7,315,539 B2
(45) Date of Patent: Jan. 1, 2008

(54) METHOD FOR HANDLING DATA BETWEEN A CLOCK AND DATA RECOVERY CIRCUIT AND A DATA PROCESSING UNIT OF A TELECOMMUNICATIONS NETWORK NODE OF AN ASYNCHRONOUS NETWORK, AS WELL AS A BIT RATE ADAPTATION CIRCUIT AND A CLOCK AND DATA RECOVERY SYSTEM

(75) Inventors: Matthias Sund, Berlin (DE); Jörg Karstädt, Berlin (DE); Jürgen Wolde, Berlin (DE)

(73) Assignee: Alcatel, Paris (FR)

( * ) Notice: Subject to any disclaimer, the term of this patent is extended or adjusted under 35 U.S.C. 154(b) by 933 days.

(21) Appl. No.: 10/720,261

(22) Filed: Nov. 25, 2003

(65) Prior Publication Data

US 2004/0153771 A1    Aug. 5, 2004

(30) Foreign Application Priority Data

Dec. 18, 2002    (EP) ................... 02360358

(51) Int. Cl.
*H04J 3/06*    (2006.01)
(52) U.S. Cl. ............ 370/354; 370/395.62; 370/395.7; 370/514; 370/516; 375/371; 375/372; 710/29; 714/22
(58) Field of Classification Search ........... 370/395.62, 370/395.7, 354, 516; 375/354, 371, 372; 710/29; 714/22
See application file for complete search history.

(56) References Cited

U.S. PATENT DOCUMENTS

| | | |
|---|---|---|
| 5,956,748 A | 9/1999 | New |
| 6,134,155 A | 10/2000 | Wen |
| 6,166,963 A | 12/2000 | Wen |
| 6,212,122 B1 * | 4/2001 | Wen ...................... 365/230.05 |
| 6,278,718 B1 | 8/2001 | Eschholz |
| 2002/0023238 A1 | 2/2002 | Horikawa et al. |
| 2004/0057539 A1 * | 3/2004 | Boles et al. ................. 375/354 |

FOREIGN PATENT DOCUMENTS

| | | |
|---|---|---|
| EP | 1 039 371 A1 | 9/2000 |
| FR | 2 693 333 A1 | 1/1994 |
| GB | 2 275 852 A2 | 9/1994 |
| GB | 2 362 777 A | 11/2001 |
| GB | 2 366 125 A | 2/2002 |

* cited by examiner

*Primary Examiner*—Seema S. Rao
*Assistant Examiner*—Henry Baron
(74) *Attorney, Agent, or Firm*—Sughrue Mion, PLLC

(57) ABSTRACT

A method for handling data between a clock and data recovery system CDR and a data processing unit DP of a telecommunications network node TNN of an asynchronous communications network, using a bit rate adaptation circuit BAS, the bit rate adaptation system BAS including a memory unit MEM with a write process circuit Wp controlled by the recovered clock Rclk and a read process circuit Rp controlled by the local clock Lclk where the bit rate adaptation system BAS also includes a pointer synchronization controller PSC which, depending on the data detected on the input data signal DIb1 of the bit rate adaptation system BAS, sets the read and write pointers to a fixed initial address value. A Clock and Data Recovery system and a telecommunications network node TNN of an asynchronous network, which include a bit adaptation circuit BAS according to the invention, are also disclosed.

5 Claims, 4 Drawing Sheets

METHOD FOR HANDLING DATA BETWEEN A CLOCK AND DATA RECOVERY CIRCUIT AND A DATA PROCESSING UNIT OF A TELECOMMUNICATIONS NETWORK NODE OF AN ASYNCHRONOUS NETWORK, AS WELL AS A BIT RATE ADAPTATION CIRCUIT AND A CLOCK AND DATA RECOVERY SYSTEM

BACKGROUND OF THE INVENTION

The invention relates to a method for handling data between a clock and data recovery circuit and a data processing unit of a telecommunications network node of an asynchronous network, and to a bit rate adaptation circuit, a clock and data recovery system and a telecommunications network node which implement said method.

Typically, network node elements of communication networks structurally comprise an input port, a Clock and Data Recovery circuit, a bit rate adaptation system, a data processing system and an output port. The Clock and Data Recovery circuit, in charge of regenerating the data received at the input port and the clock at which this data was transmitted throughout the network, passes these two signals to a bit rate adaptation system which is in charge of transmitting the recovered data to the node processing stage (switching/routing) at a rate which is indicated by the local clock of the network node.

Within network node elements dedicated to synchronous transport (e.g. SDH/SONET), such bit rate adaptation systems comprise usually a first-in-first-out (FIFO) memory with read and write pointers which are controlled by two independent clocks, a local network node clock and a recovered data clock taken out from the input signals, respectively.

In synchronous networks, such as SDH/SONET, clock generation and distribution can be well controlled, as data signal timing is related to a single timing reference (i.e. global reference). Incoming data frames to the network node are written onto and read from the memory stack in a synchronous manner, that is, read and write pointers are triggered with independent clocks which run continuously and more or less synchronously. In U.S. Pat. No. 6,166,963 for example, a system is disclosed which comprises a FIFO memory stack, a write unit, a read unit and a first and a second synchronization circuit. The write unit is configured to add elements to the FIFO memory stack based upon a first clock domain, and the read unit is configured to read elements from the FIFO stack based upon a second clock domain. The first synchronization circuit is operationally coupled with the write unit and is configured to receive the write pointer and synchronize it to the second clock domain. The second synchronization circuit is operationally coupled with the read unit and is configured to receive the read pointer and synchronize it to the first clock domain.

On the other hand, new type of asynchronous networks introduce new requirements for network node internal subsystems. U.S. Pat. No. 6,278,718 although suited for another type of asynchronous communication, more specifically, distributed asynchronous networks, is seen as the closest state of the art concerning the present invention.

SUMMARY OF THE INVENTION

We define here an asynchronous network as one in which the network nodes do not share global synchronization at the bit level. Instead, each node operates with independent bit level clocks, that is, in each node, the bit level clock (or local clock, used to drive the subsystems within the node) operates at a standardized nominal bit rate, but there is no attempt made to achieve phase synchronization between bit-level clocks in different nodes. The physical optical transmission across the network occurs in burst mode, where a "burst" is a finite contiguous string of bits in a standardized signal format and may represent an individual packet or cell (with header and payload). Routing across the network could be achieved by any appropriate method, such as circuit switching, packet or cell switching, self-routing, etc.

In this type of networks, the incoming data frames begin with a bit synchronization field including a synchronization sequence with bit level changes, which is used by the Clock and Data Recovery circuit to produce the recovered clock output and regenerate the data signal, but in contrast to the synchronous transport frames, they come with an associated gap or guard band of variable length which does not include reference data and is composed of a constant "0" or constant "1" bit level. During this gap time then, because the needed bit level changes on the data signal are missing, the recovered clock will not be generated, the bit rate adaptation system will not trigger the write process and thus no data is written into the memory stack. Meanwhile the local clock, which triggers the read process, will run continuously during this time and read information from the memory.

We see then that the use in this case of traditional circuits as the ones described above for synchronous transmission would result in a misalignment of the read and write processes and consequently the passing of erroneous information to the data processing stage of the node.

Accordingly an improved system and method for data handling is needed, and more specifically a bit rate adaptation system which avoids the misalignment of the read and write processes.

An improved system and method for the handling of data between a Clock and Data Recovery circuit and a data processing unit of an asynchronous communications network node is herein provided to avoid passing of erroneous data to said data processing stage.

The object is achieved according to the invention by a method for handling data between a Clock and Data Recovery circuit and a processing unit of a telecommunications network node of an asynchronous network according to claim 1, a bit rate adaptation circuit according to claim 2, a Clock and Data Recovery system according to claim 3 and a telecommunications network node according to claim 4.

The present invention is not restricted to a FIFO-based method or system. It can be applied to any common memory unit, such as a transfer buffer or queue, through which the data are transferred from one entity to another.

BRIEF DESCRIPTION OF THE DRAWINGS

Advantageous configurations of the invention emerge from the dependent claims, the following description and the drawings.

An embodiment example of the invention is now explained with the aid of FIGS. 1 to 4.

DETAILED DESCRIPTION OF THE DRAWINGS

Figure 1:
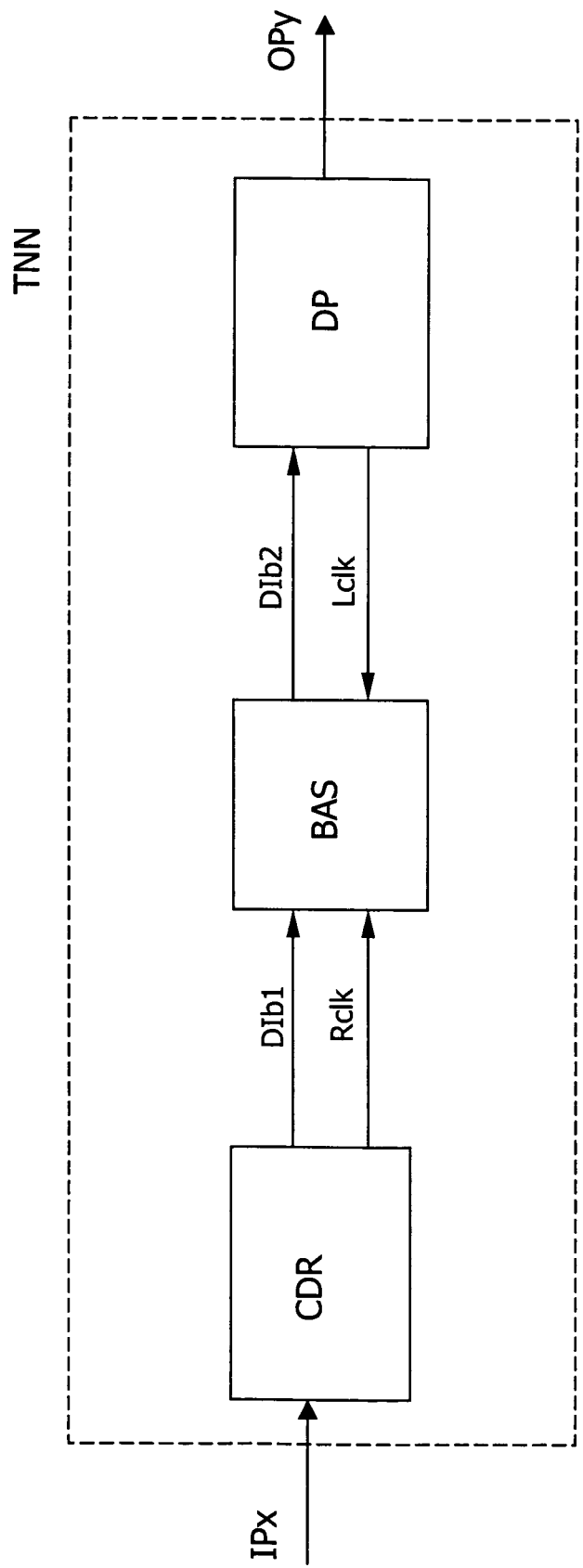
FIG. 1 shows a high level block diagram of a telecommunications network node of an asynchronous network according to the invention.

FIG. 1 shows a high level block diagram of a telecommunications network node of an asynchronous network TNN, comprising an input port IPx, a Clock and Data Recovery circuit CDR, a Bit Rate Adaptation circuit, often called Bit Rate Adaptation system BAS, according to the present invention, a Data Processing system DP and an output port OPy.

The input port IPx is connected to the Clock and Data Recovery circuit CDR, said circuit CDR passing the recovered data at incoming bit rate DIb1 and the recovered clock Rclk to the Bit Rate Adaptation circuit BAS, which adapts data to the local bit rate using a local clock Lclk as a reference, according to the invention, this data DIb2 being passed to the Data Processing unit DP for Switching or Routing operations and being transmitted to the network through the output port OPy.

Figure 2:
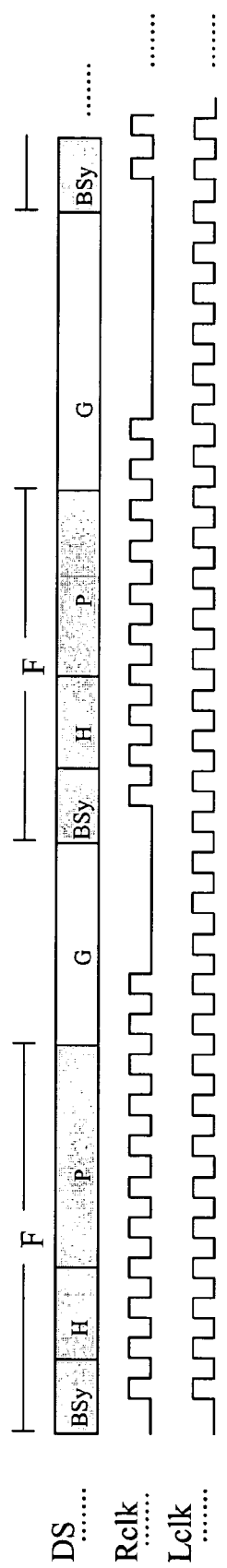
FIG. 2 shows the data structure received by the telecommunications network node according to the invention and the timing diagram of the recovered and local clock of said node.

FIG. 2 shows the data structure DS received by the telecommunications network node TNN of an asynchronous network according to the invention at the input port IPx and the timing diagram of the recovered Rclk and local clock Lclk of said node.

Each data frame packet F comprises a bit synchronization field BSy, a header field H and a payload field P. A guard band G between frames F which does not contain valid data and bit level changes and whose length or duration is variable, is used to maintain proper separation of frames F and to allow time for the operation of routing switches.

When a new data frame F is received at the node, the Clock and Data Recovery circuit CDR will detect the bit synchronization field BSy and from the bit level changes of the data it will adapt its recovered clock Rclk output to the incoming data frequency and phase. During the guard band G duration, because no level changes exist, no recovered clock Rclk will be generated. On the other hand, it can also be seen in the figure that the local clock Lclk runs continuously.

Figure 3:
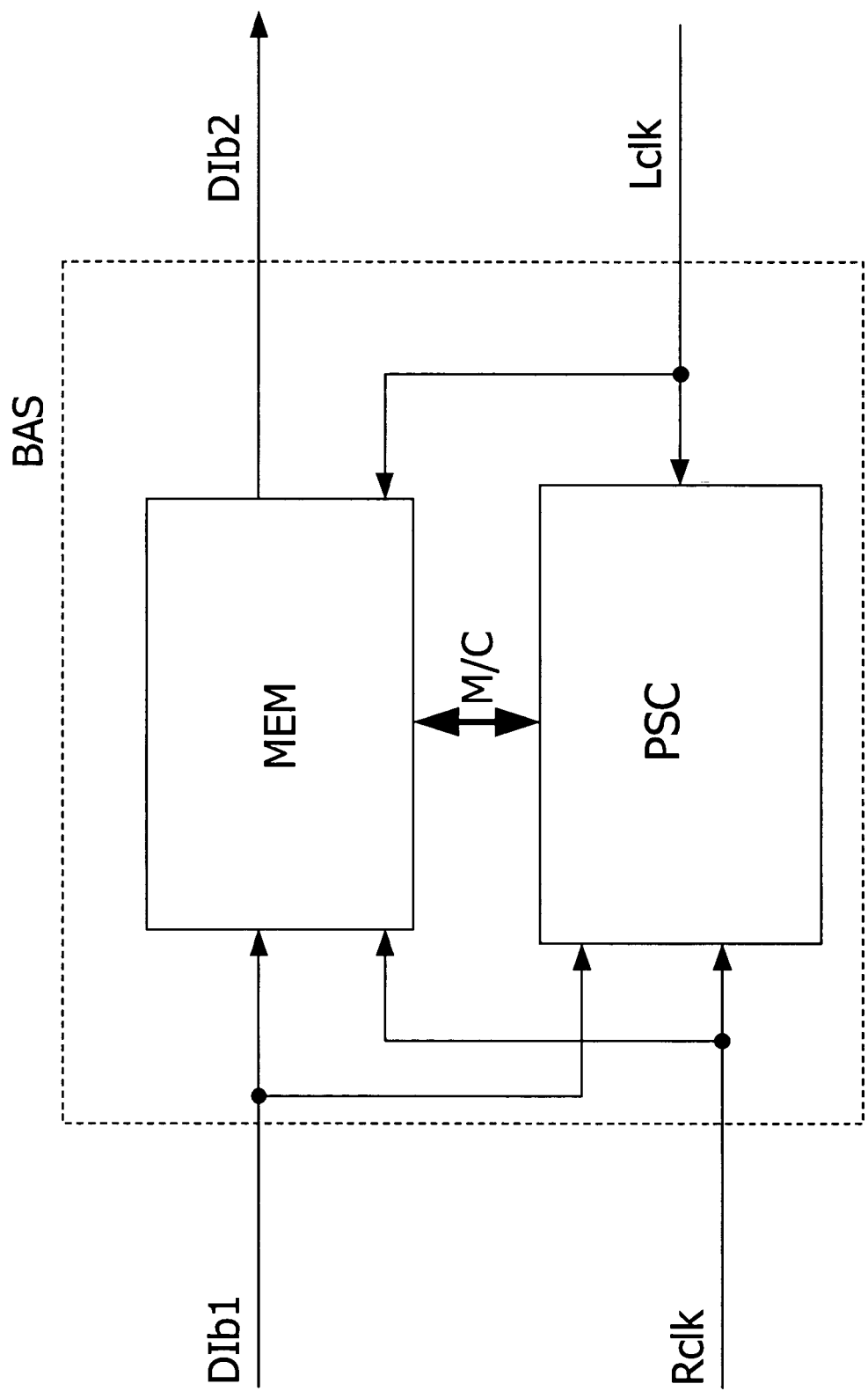
FIG. 3 shows a block diagram of the bit rate adaptation system of the telecommunications network node according to the invention.

FIG. 3 shows the preferred embodiment of the Bit Rate Adaptation circuit BAS of a telecommunications network node according to the invention, which comprises a memory unit MEM and a Pointer Synchronization Controller PSC.

Asynchronous data in the form of frames F arrive on data input line DIb1 and are written into the memory unit MEM with a clock controlled by the recovered clock input Rclk. A local clock Lclk input controls the reading of data from the memory unit MEM which appears on the data output line DIb2.

The Pointer Synchronization Controller PSC monitors the frames F present in the input data line DIb1, receives as input the recovered clock Rclk and the local clock Lclk, and monitors/controls the addresses of the Read and Write Pointers via the monitor/control line M/C.

Figure 4:
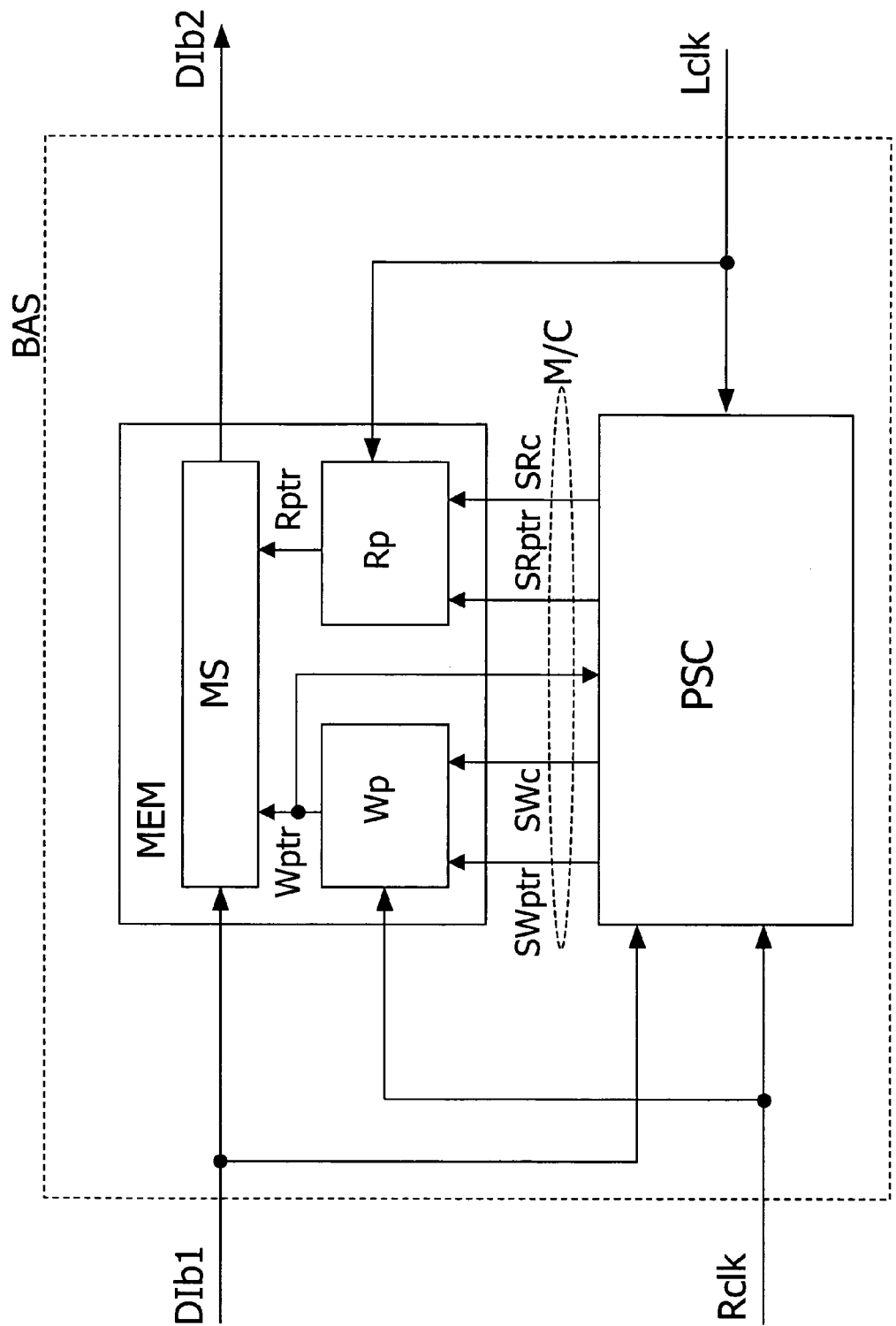
FIG. 4 shows a more detailed block diagram of the bit rate adaptation circuit of FIG. 3.

In FIG. 4 is schematically shown the detailed construction of a preferred embodiment of the Bit Rate Adaptation circuit BAS according to the invention, comprising the memory unit MEM with a memory stack MS, a write process circuit Wp and a read process circuit Rp, and a Pointer Synchronization Controller PSC.

The Bit Rate Adaptation circuit BAS has a recovered data input DIb1 connected to the memory stack MS and the Pointer Synchronization Controller PSC; a recovered clock input Rclk connected to the write process circuit Wp and the Pointer Synchronization Controller PSC; and a local clock input Lclk connected the read process circuit Rp and the Pointer Synchronization Controller PSC. The data output DIb2 of the Bit Rate Adaptation circuit BAS being the output of the memory stack MS, and the Pointer Synchronization Controller PSC being also connected to the read Rp and write process circuit Wp, which are connected to the memory stack MS.

Data frame F elements are stored on a stack MS in a manner so that the oldest elements are removed first. One process may add elements to the stack MS, called write process, and another may remove elements from the stack MS and pass them to the next processing system, called read process. The write process circuit Wp must maintain an address pointer, called write pointer Wptr, so that it can add elements to the stack MS. Similarly, the read process circuit Rp must maintain an address pointer, called read pointer Rptr, so that it can remove elements from the stack MS. The write process circuit Wp generates the write pointer Wptr in the recovered clock Rclk domain and the read process circuit Rp generates the read pointer Rptr in the local clock Lclk domain.

An additional Pointer Synchronization Controller PSC circuitry will control the right alignment of both memory address pointers and thus avoiding passing wrong data information to the next stage following the bit adaptation system.

Initially, the write process Wp begins by storing an element at a fixed memory stack MS location. The write process Rp then adds frame F elements at sequential memory locations by incrementing the write pointer Wptr at a rate indicated by the recovered clock Rclk. When the end of the data frame F has been reached and the pointer synchronization controller PSC detects a guard band G, it will set the write pointer, by means of a set command SWc and a write address set signal SWptr, to a fixed address value (e.g. "0"), which will be starting address for storing the header H and payload P field elements of the data frame F in the memory stack MS.

The read process Rp, always following the write process Wp, begins by removing the frame F element from the initial fixed memory stack location. The read process Rp then continues to remove frame F elements at sequential memory locations by incrementing the read pointer Rptr at a rate indicated by the local clock Lclk. When the end of the data frame F has been reached the read process Rp will continue to read from the stack MS and pass invalid information to the next data processing stage DP of the telecommunications network node TNN. This data however, will be discarded at the processing stage DP. When the pointer synchronization circuit PSC detects the beginning of a new frame F input, that is, the bit synchronization field BSy of the data frame F, it will set, by means of a set command SRc and a read address set signal SRptr, the read pointer Rptr to the same fixed initial value used for the write pointer Wptr.

The described process is repeated continuously for every frame F input.

It has to be noted that here the pointer synchronization controller PSC is not necessarily limited to detecting the specific fields mentioned above. It is also understood that it could be implemented in such a flexible manner so that any data string combination is recognized.

Also, it is worth to mention that in some cases it is advantageous to integrate the bit rate adaptation function BAS into a Clock and Data Recovery system or into a memory unit circuit.

The invention claimed is:

1. A method for handling data between a Clock and Data Recovery (CDR) circuit and a data processing unit of a telecommunications network node of an asynchronous network, using a bit rate adaptation system comprising a memory unit and Pointer Synchronization Controller, said memory unit having a memory stack and a write process circuit and a read process circuit, said method comprising the steps of:

the CDR passing recovered data and recovered clock signals to the bit rate adaptation system and the bit rate adaptation system handling the data to the processing unit at a rate indicated by a local node clock;

the write process circuit, controlled by the recovered clock, incrementing a write pointer and writing the recovered data into the memory address indicated by said write pointer, and the read process circuit controlled by the local clock incrementing a read pointer and reading the recovered data from the memory address indicated by said read pointer, both pointers running free until the end of a data frame; and the pointer synchronization controller monitoring the recovered data signal to detect guard bands between data frames and bit synchronization fields and, depending on this information, acting on the pointers of the memory unit wherein upon detecting the guard band between data frames, the write pointer is set to a predetermined fixed initial address; and upon detecting the bit synchronization field of the input data frame, the read pointer is set to said write pointer fixed initial address.

2. A bit rate adaptation circuit for handling data between a Clock and Data Recovery circuit and a processing unit of a telecommunications network node of an asynchronous network, comprising a memory unit with a memory stack, a read process circuit Rp and a write process circuit Wp, built in such a manner so that the write process circuit, controlled by a recovered clock input coming from the Clock and Data Recovery circuit, increments a write pointer and writes data into the memory address indicated by said write pointer, and the read process circuit, controlled by a local node clock, increments a read pointer and reads data from the memory address indicated by said read pointer; and a pointer synchronization controller built in such a manner so that it is able to monitor the recovered data signal and detect guard bands between data frames and bit synchronization fields and, depending on this information, is able to act on the pointers of the memory unit MEM, wherein the pointer synchronization controller is further built such that it sets the write pointer to a predetermined fixed initial address value when a guard band is detected, and sets the read pointer to said fixed initial address value of the write pointer when a bit synchronization field is detected.

3. A Clock and Data Recovery system of a telecommunications network node of an asynchronous network comprising a Clock and Data Recovery circuit and the bit rate adaptation circuit according to claim 2.

4. A telecommunications network node of an asynchronous network comprising a bit rate adaptation circuit according to claim 2 for handling data between a Clock and Data Recovery circuit and a processing unit of a telecommunications network node of an asynchronous network, comprising a memory unit with a memory stack, a read process circuit Rp and a write process circuit Wp, built in such a manner so that the write process circuit, controlled by a recovered clock input coming from the Clock and Data Recovery circuit, increments a write pointer and writes data into the memory address indicated by said write pointer, and the read process circuit, controlled by a local node clock, increments a read pointer and reads data from the memory address indicated by said read pointer; and a pointer synchronization controller built in such a manner so that it is able to monitor the recovered data signal and detect guard bands between data frames and bit synchronization fields and depending on this information is able to act on the pointers of the memory unit MEM, wherein the pointer synchronization controller is further built such that it sets the write pointer to a predetermined fixed initial address value when a guard band is detected, and sets the read pointer to said fixed initial address value of the write pointer when a bit synchronization field is detected or a Clock and Data Recovery system according to claim 3.

5. A telecommunications network node of an asynchronous network comprising a Clock and Data Recovery System according to claim 3.

* * * * *